March 13, 1962    J. A. WHITE    3,024,659
MAGNETICALLY CENTERED LIQUID COLUMN FLOAT
Filed Sept. 12, 1958

INVENTOR
JAMES A. WHITE

BY  R. J. Tompkins
ATTORNEYS 3,024,659
MAGNETICALLY CENTERED LIQUID
COLUMN FLOAT
James A. White, Los Altos, Calif., assignor, by mesne assignments, to the United States of America as represented by the Administrator of the National Aeronautics and Space Administration
Filed Sept. 12, 1958, Ser. No. 760,819
4 Claims. (Cl. 73—401)
(Granted under Title 35, U.S. Code (1952), sec. 266)

The invention described herein may be manufactured and used by or for the Government of the United States of America for governmental purposes without the payment of any royalties thereon or therefor.

This invention relates to a liquid column float which is automatically centered in the liquid, this float having special adaptation for use with manometers.

Floats have been used in manometer tubes, for example, in which iron or other magnetic substance has been incorporated and this iron has been utilized in association with electrical circuits to indicate automatically the height of a liquid column in the tube. A difficulty present in the prior manometer lies in the fact that in the up and down movement of the float, contact of the float with the tube wall involves a certain amount of friction resulting in a clearly defined error in the manometer reading.

A primary object, therefore, of the invention is to eliminate friction between the movable float and the wall of a manometer tube. Another object is to eliminate use of mechanical centering devices for tube floats.

Other objects and many of the attendant advantages of this invention will be readily appreciated as the same becomes better understood by reference to the following detailed description when considered in connection with the accompanying drawings wherein.

Figure 1:
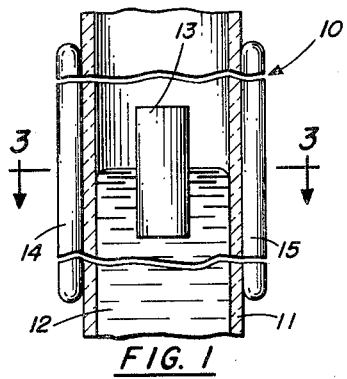
FIG. 1 is a sectional fragmentary view of a section of a manometer tube containing the supporting liquid and float and indicating the coil float centering means.

References may now be made to FIG. 1 in which appears a vertical section of a conventional manometer 10 including a tube 11, the tube containing a suitable liquid 12, as mercury, and a float 13 supported on the upper surface or meniscus of the mercury. On opposite sides of tube 11 are wire coils 14 and 15, each coil consisting of a number of insulated wire conductors 16 (FIG. 3) wound in elongated rectangular form to constitute an induction coil, the terminal leads 20 and 21 of one of the coils being indicated in FIG. 2. These coils 14 and 15 are connected electrically together, either in parallel or series, to a common electric source, the polarity of the connections being such as to give for direct current or for one alternation of alternating current, the direction of flow indicated in FIG. 3. Preferably, the coils 14 and 15 should be elongated to the extent that the magnetic effects of the cross wires 17 and 18 relative to the float are effectively reduced.

Figure 2:
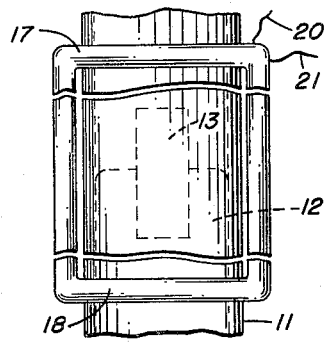
FIG. 2 is a side elevation of the tube of FIG. 1.
Figure 3:
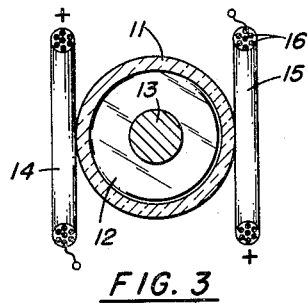
FIG. 3 is a plan view of the manometer elements taken along lines 3—3 of FIG. 1.

The float 13, in the arrangement of FIGS. 1, 2 and 3 and assuming an application of alternating current, is an electrically conducting metal, such as copper, the float forming a core in the space between the coils 14 and 15. Under the influence of the applied electromagnetic flux, eddy currents are induced in this metal float, the direction of eddy currents being such as to result in repulsion forces in respect to the magnetizing coils, with the result that the float is shifted centrally to a point of force equilibrium with reference to the coil magnetic flux. Consequently, the float, physically is held centrally in the manometer tube and, in up and down movement thereof, all frictional contact is eliminated.

Figure 4:
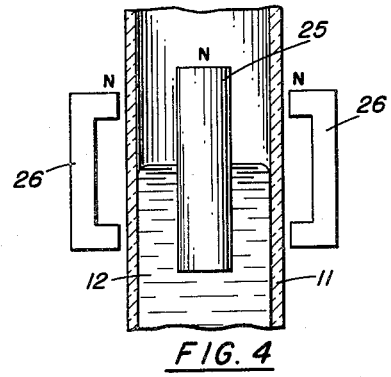
FIG. 4 is a vertical view of a manometer float section showing a permanent magnet control.

In FIG. 4, a modification of the invention is disclosed wherein the float 25 consists of a permanently magnetized core of steel, or nickel, or alloys containing one or more of these metals, and the magnetizing means one or more permanently magnetized magnet 26 external to and adjacent the tube in the region of float movement. The polarity of the permanent magnet and core float are as indicated in the drawing (FIG. 4) producing an opposing magnetic flux and insuring a centering of the float.

Figure 5:
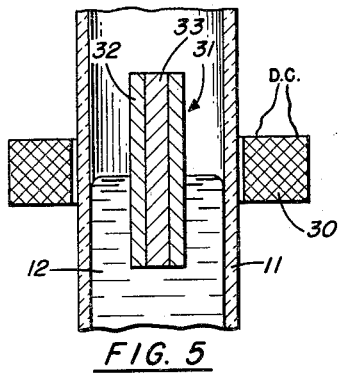
FIG. 5 is a sectional fragmentary view showing a direct current coil applied to a permanently magnetized float.

The arrangement of FIG. 5 employs an inducing coil 30 energized by direct current. The float is shown in this figure as consisting of a permanent magnet 33 in the float body 32. The permanent magnet should normally extend above and below the coil 30 in order to minimize vertical forces. This core, when the tube material is iron, lends itself to joint use with automatic level indicating means such as the automatic liquid column manometer described in the patent to Waldo H. Kliever, Patent No. 2,357,745 wherein a coil follower moves up and down the manometer in magnetic flux equilibrium with an iron float.

Figure 6:
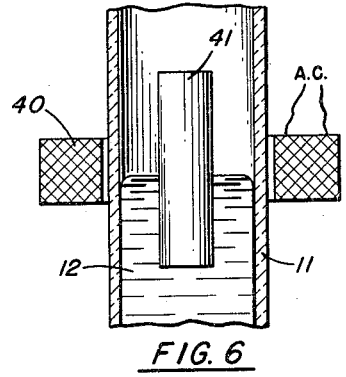
FIG. 6 is a sectional fragmentary view showing an alternating current coil applied to a soft iron float.

FIG. 6, also, employs a peripheral coil 40 about the tube 11, the coil in this modification being supplied by alternating current and the core 41 consisting of non-magnetic metal for eddy current development.

Obviously many modifications and variations of the present invention are possible in the light of the above teachings. It is therefore to be understood that within the scope of the appended claims the invention may be practiced otherwise than as specifically described.

What is claimed is:

1. In a manometer, a liquid level indicating device comprising a tube containing the liquid, a float member positioned in said liquid to be freely axially displaceable in said tube, said float member being buoyant in said liquid and being constrained against rotary motion by the viscosity of said liquid, means external to said tube to establish a first magnetic field in said tube, and internal means comprising the material of said float for establishing a second magnetic field having a direction with respect to said externally established magnetic field such that repelling forces are established between said first and second magnetic fields to radially center said float in said tube.

2. Apparatus as in claim 1 wherein said external magnetic field establishing means is a permanent magnet and said float comprises a permanent magnet with its poles oriented the same as those of the external magnet.

3. Apparatus as in claim 1 wherein said external magnetic field establishing means is a coil excited by direct current and said float comprises a permanent magnet having its poles oriented the same as the polarity of said externally generated field.

4. Apparatus as in claim 1 wherein said external field establishing means is a coil excited by alternating current and said float comprises a nonmagnetizable metal of low electrical resistance in which eddy currents are generated by said first magnetic field.

References Cited in the file of this patent

UNITED STATES PATENTS

| | | |
|---|---|---|
| 2,357,745 | Kliever | Sept. 5, 1944 |
| 2,436,939 | Schug | Mar. 2, 1948 |
| 2,558,118 | Yost | June 26, 1951 |
| 2,747,944 | Baermann | May 29, 1956 |

FOREIGN PATENTS

| | | |
|---|---|---|
| 839,876 | Germany | May 26, 1952 |